United States Patent
Kohler et al.

(10) Patent No.: US 9,604,572 B2
(45) Date of Patent: Mar. 28, 2017

(54) METHOD FOR MAINTAINING A WARNING SIGNAL IN A MOTOR VEHICLE ON THE BASIS OF THE PRESENCE OF A TARGET OBJECT IN A WARNING REGION, IN PARTICULAR A BLIND SPOT REGION, CORRESPONDING DRIVER ASSISTANCE SYSTEM, AND MOTOR VEHICLE

(71) Applicant: VALEO Schalter und Sensoren GmbH, Bietigheim-Bissingen (DE)

(72) Inventors: Markus Kohler, Waldbronn (DE); Urs Luebbert, Bietigheim-Bissingen (DE); Roland Geiger, Stuttgart (DE); Stefan Goerner, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/652,921

(22) PCT Filed: Sep. 18, 2013

(86) PCT No.: PCT/EP2013/069404
§ 371 (c)(1),
(2) Date: Jun. 17, 2015

(87) PCT Pub. No.: WO2014/095104
PCT Pub. Date: Jun. 26, 2014

(65) Prior Publication Data
US 2016/0023598 A1  Jan. 28, 2016

(30) Foreign Application Priority Data
Dec. 19, 2012 (DE) .......................... 10 2012 025 064

(51) Int. Cl.
*B60Q 1/00* (2006.01)
*B60Q 9/00* (2006.01)
*G01S 13/93* (2006.01)

(52) U.S. Cl.
CPC ............ *B60Q 9/008* (2013.01); *G01S 13/931* (2013.01); *G01S 2013/9332* (2013.01)

(58) Field of Classification Search
CPC .................................................... B60Q 9/008
(Continued)

(56) References Cited

U.S. PATENT DOCUMENTS 6,674,394 B1    1/2004  Zoratti
2001/6265968   *  7/2001  Betzitza ........................ 340/436
(Continued)

FOREIGN PATENT DOCUMENTS

DE    10 2006 034122 A1    1/2008
DE    10 2008 061 357 A1   6/2010
DE    10 2009 057 191 A1   6/2011

OTHER PUBLICATIONS

International Search Report issued in PCT/EP2013/069404 mailed on Jan. 22, 2014 (3 pages).
(Continued)

*Primary Examiner* — Brent Swarthout
(74) *Attorney, Agent, or Firm* — Osha Liang LLP

(57) ABSTRACT

A method for the output of a warning signal for warning the driver of a motor vehicle about the presence of a vehicle-external target object in a warning region, which is prescribed in relation to the motor vehicle, by means of a driver assistance system of the motor vehicle, in which a radar sensor is used to transmit electromagnetic radar signals into a sensing region of the radar sensor in each of successive measurement cycles of the radar sensor and to receive received signals, the received signals are used for detection
(Continued)

Figure 1:
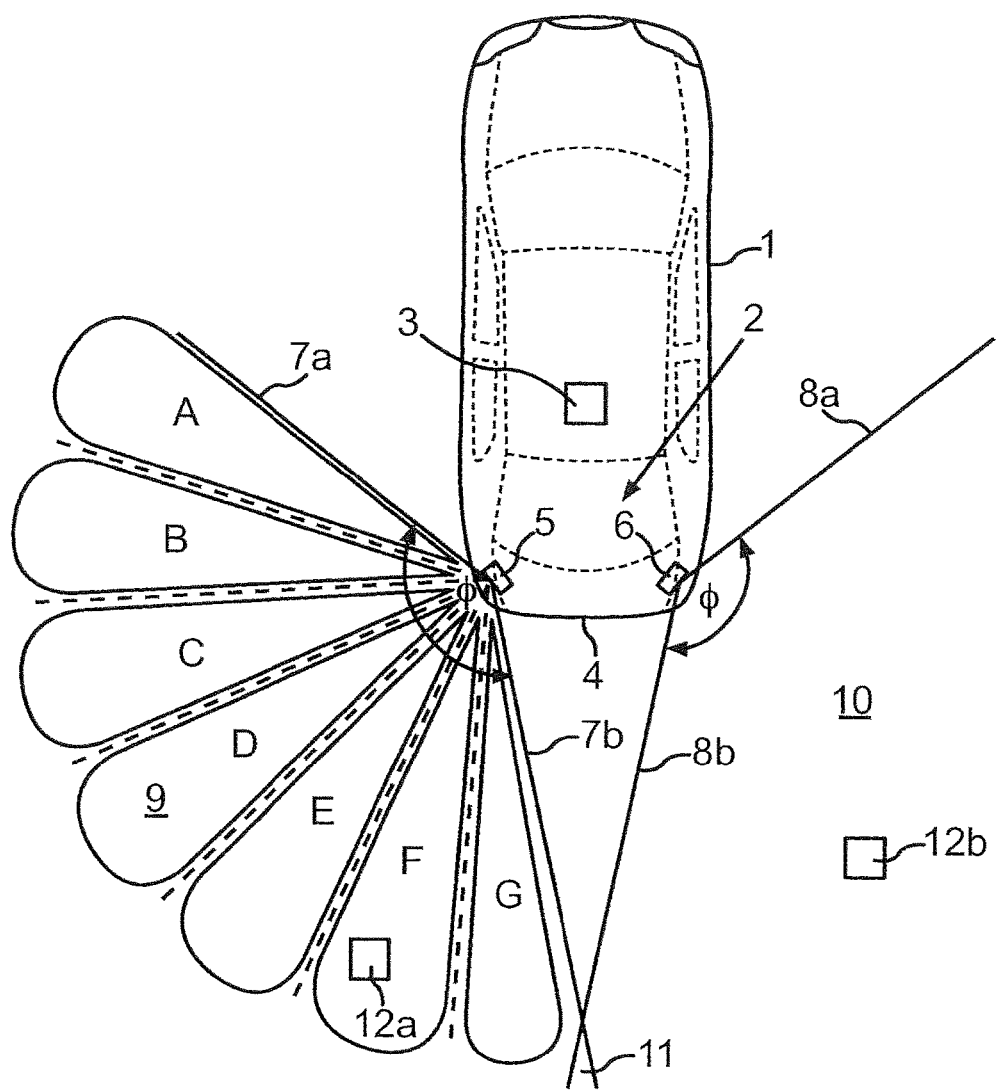

of the target object by means of the radar sensor and for tracking said target object in the sensing region over the measurement cycles, and, if the target object enters the prescribed warning region, the warning signal is output by means of an output device.

12 Claims, 2 Drawing Sheets

(58) Field of Classification Search
USPC .................................................. 340/903, 435
See application file for complete search history.

(56) References Cited

U.S. PATENT DOCUMENTS

| 2002/0147534 | A1 | 10/2002 | Delcheccolo et al. |
| 2005/0190048 | A1* | 9/2005 | Yagyu .................... B60Q 5/005 340/435 |
| 2005/0275514 | A1* | 12/2005 | Roberts .................... B60Q 5/00 340/436 |
| 2007/0146196 | A1* | 6/2007 | Oka .................... B60R 21/0134 342/70 |
| 2008/0018523 | A1* | 1/2008 | Kelly, Jr. ................ G01S 7/354 342/70 |
| 2008/0252482 | A1* | 10/2008 | Stopczynski ........... G01S 13/87 340/903 |
| 2009/7602276 | * | 10/2009 | Madau .......................... 340/435 |
| 2011/0163909 | A1 | 7/2011 | Jeong |
| 2011/0291874 | A1 | 12/2011 | De Mersseman |

OTHER PUBLICATIONS

German Search Report issued in 10 2012 025 064.9 mailed on Mar. 18, 2013 (5 pages).

* cited by examiner

METHOD FOR MAINTAINING A WARNING SIGNAL IN A MOTOR VEHICLE ON THE BASIS OF THE PRESENCE OF A TARGET OBJECT IN A WARNING REGION, IN PARTICULAR A BLIND SPOT REGION, CORRESPONDING DRIVER ASSISTANCE SYSTEM, AND MOTOR VEHICLE

The invention relates to a method for outputting a warning signal that is used to warn the driver of a motor vehicle about the presence of a vehicle-external target object in a warning region that is prescribed in relation to the motor vehicle. A radar sensor is used to transmit electromagnetic radar signals into a sensing region of the radar sensor in each of successive measurement cycles, and radar signals reflected by the target object are received as received signals by the radar sensor. The received signals are used for detection of the target object by means of the radar sensor and for tracking said target object in the sensing region over the measurement cycles. If the target object enters the prescribed warning region, the warning signal is output or initiated by means of an output device. The invention furthermore relates to a driver assistance system for performing such a method and to a motor vehicle having such a driver assistance system.

Radar sensors for motor vehicles (automotive radar sensors) are already prior art and are operated at a frequency of approximately 24 GHz or approximately 79 GHz. Radar sensors are generally used for detecting target objects in the surroundings of the motor vehicle and assist the driver in many aspects of driving the motor vehicle. The interest in the present case is directed particularly at a blind spot identification system (blind spot warning) that is used to warn the driver about the presence of target objects in the blind spot of the motor vehicle.

Radar sensors firstly measure the interval between the target object and the vehicle. Secondly, they also measure both the relative speed in relation to the target object and what is known as the target angle, i.e. an angle between an imaginary connecting line to the target object and a reference line, for example the vehicle longitudinal axis. Using a radar sensor, it is therefore possible to determine the respective current position of the target object relative to the vehicle, and the target object can be tracked in the sensing region of the radar sensor i.e. the relative position of the target object can be determined continuously over a multiplicity of measurement cycles of the radar sensor. "Tracking" is successful provided that the reflection points detected at the target object remain stable over the measurement cycles.

Radar sensors are usually placed behind the bumper, for example in the respective corner regions of the rear bumper. In order to detect the target object, the radar sensor transmits a transmission signal (electromagnetic waves) that is then reflected at the target object to be detected and is received as a radar echo by the radar sensor. The present case involves particularly what is known as a frequency modulated continuous wave radar sensor (FMCW radar), in which the transmitted signal comprises a sequence (burst) of frequency-modulated chirp signals that are transmitted one after the other. Accordingly, the received signal of the radar sensor also contains such a multiplicity of chirp signals, which are processed and evaluated in respect of the aforementioned measured variables. This involves the received signal being first of all converted down to baseband and then being converted into a digital received signal having a multiplicity of samples by means of an analogue-to-digital converter and transformed using FFT (Fast Fourier Transformation). The samples are then processed in the time domain and/or in the frequency domain by means of an electronic computation device (digital signal processor).

A radar sensor is used to sense typically a relatively wide azimuthal angle range, which may even be 150°, in the horizontal direction. The radar sensor thus has a relatively large azimuthal sensing angle, which means that the field of view or sensing region of the radar sensor is of corresponding width in the azimuthal direction. The azimuthal sensing angle is normally symmetrical with respect to a radar axis running perpendicular to the front sensor face, which means that the azimuthal sensing angle is measured from −75° to +75° for example, in relation to the radar axis. This azimuthal sensing region may be divided into smaller subregions that are irradiated or sensed by the radar sensor one after the other. For this purpose, by way of example, the main lobe of the transmission antenna is electronically swivelled in the azimuthal direction, for example on the basis of the phase-array-principle. In this case, the reception antenna can have a reception characteristic in the azimuthal direction, that covers the whole azimuthal sensing region. Such a radar sensor is known from the document DE 10 2009 057 191 A1, for example. A further radar sensor is revealed by the document US 2011/0163909 as being known.

A radar sensor can thus also be used to monitor the blind spot of a motor vehicle and to warn the driver if need be. In the prior art, the functionality of the blind-spot monitoring is based on the cited target tracking: the radar sensor first of all detects the target object, for example another vehicle, and tracks this target object in the sensing region. When the target object—for example when overtaking the driver's own motor vehicle—enters a prescribed warning region that corresponds to the blind spot, a warning signal is output in the motor vehicle. The driver is therefore informed about the presence of the target object in the blind spot. In order to be able to track the target object over a multiplicity of measurement cycles of the radar sensor, it is necessary to obtain a sufficient number of raw detections for one and the same target object. This means that a reflection point detected for the target object in one particular measurement cycle also needs to be detected in a subsequent measurement cycle. In other words, stable tracking of the target object thus means that the detections each come from a reflection point on the target object that remains stable in terms of distance and angle between successive measurement cycles. Therefore, reflection points detected in different measurement cycles are associated with one another.

The detection of reflection points alone typically takes place in the frequency domain. The reflection points on a target object or the target objects are represented by peaks in the reception spectrum. The target echoes and measurement noise are additively superimposed in this case. The measurement noise is frequency-dependent and increases at higher frequencies. What is known as "clutter", that is to say undesirable reflections from the ground, vegetation and expansive infrastructure objects and the like, also means that additional interference signals are superimposed on the useful signal on a frequency-dependent basis. The signal peaks or target echos that are present in the received signal are therefore detected using a threshold value detector. If the level of the received signal is above the detection threshold, detection takes place. The detection threshold is determined adaptively during operation of the radar sensor, specifically on the basis of the CFAR (constant false alarm rate) method, for example. In accordance with this method, the detection threshold is customized such that it always lies above the noise level by a prescribed factor. If there is no target object, the detector incorrectly detects a target whenever the noise signal or interference signal is above the detection threshold. If the detection threshold is set relative to the interference power, a constant false alarm rate is obtained i.e. a constant likelihood of the instantaneous interference signal exceeding the detection threshold.

In order to determine the exact frequency of the target echos in the received signal precisely, the COG (centre of gravity) algorithm is applied, for example. This algorithm makes it possible to estimate the measured variables of the radar sensor more accurately and therefore to track the target objects precisely.

For a radar sensor, vehicles are expansive targets, i.e. targets that are larger than a single distance resolution cell of the radar sensor. In practice, problems therefore arise when tracking target objects and hence when outputting the warning signal to the driver. The reason is that expansive targets prompt a plurality of reflection points to interfere with one another, and the detections in successive measurement cycles to vary relatively greatly in terms of distance and angle. In the event of excessive variations, the data association and hence the correct tracking of a target object fail. The reflection behaviour of a vehicle can be modelled by a multiplicity of elementary reflections that are distributed over a plurality of distance resolution cells that to some extent are also superimposed on one another and interfere with one another within a single resolution cell. If a target was smaller than the resolution cell of the radar sensor, all elementary reflectors would interfere with one another. The resultant target models describe a point target whose reflectivity and hence the signal amplitude in the radar sensor fluctuate on the basis of a random distribution. If the target object—as in the case of a vehicle—is larger than a single distance resolution cell, not only do signal amplitudes in the individual resolution cells fluctuate but also the target distance measured in the aforementioned COG algorithm fluctuates between adjacent reflection groups. The elementary reflections themselves can also move on the surface of the vehicle.

The interference between the reflections on a vehicle and the movement of the measured reflections results in there intermittently being no stable detections possible at the input of the tracking algorithm, i.e. the measurement data fluctuate to such an extent that meaningful association of the reflection points with one another in successive measurement cycles is not possible.

This problem is particularly pronounced when a heavy goods vehicle is travelling beside the motor vehicle and is in the blind spot of the motor vehicle. The problem described is also intensified by the fact that in some countries it is not necessary for HGVs to have underride protection and on some HGVs—what are known as "trailer trucks"—there are no reflective parts in the central region beneath the trailer at the level of the radar sensor. Although the radar sensor can identify weak reflections from the lower portion of the HGV, association of reflection points in successive measurement cycles is not always guaranteed. In the case of such HGVs, it therefore also continues to be a problem that the relatively low sensitivity of the radar sensor at close range (2 m to 5 m) means that the weak reflections from the HGV cannot be detected in the absence of the underride protection.

The effect of the difficulties with target tracking is that output of the warning signal to the driver is also not always stable. The alarm may briefly fail to materialize or waver, which has a confusing effect on the driver and can lead to the driver becoming distracted.

It is an object of the invention to demonstrate a solution to how, in the case of a method of the type cited at the outset, the driver of the motor vehicle can be warned particularly reliably about the presence of the target object in the warning region in the surroundings of the motor vehicle.

The invention achieves this object by means of a method, by means of a driver assistance system and by means of a motor vehicle having the features according to the respective independent patent claims. Advantageous embodiments of the invention are the subject matter of the dependent patent claims, the description and the figures.

A method according to the invention is used to output a warning signal that is used by means of a driver assistance system of a motor vehicle to warn the driver of the motor vehicle about the presence of a target object in a warning region prescribed in relation to the motor vehicle. The driver assistance system comprises a radar sensor that is used to transmit electromagnetic radar signals into a sensing region of the radar sensor in each of the successive measurement cycles of the radar sensor and to receive radar signals reflected by the target object as received signals or received echos. The received signals are used to detect the target object and to track said target object in the sensing region over the measurement cycles. If the target object enters the prescribed warning region, an output device is used to output the warning signal in the interior of the motor vehicle. After the target object enters the warning region, the output of the warning signal is maintained for as long as the radar sensor detects the target object or another target object in its sensing region within a prescribed close range.

Thus, as soon as the target object has entered the prescribed warning region, the output of the warning signal is performed no longer or no longer just on the basis of the tracking of the target object, but rather the warning signal is maintained on the basis of whether or not detection by the radar sensor actually takes place within the prescribed close range—within a prescribed number of first distance resolution cells of the radar sensor—and in this case particularly the amplitude of the received signal—that is to say what are known as the frequency bins of the distance resolution cells under consideration—exceeds a prescribed detection threshold. The warning signal is therefore output so long as after the target object enters the warning region the radar sensor detects a reflection point of some sort within the prescribed range. If the prescribed close range contains a target, this can be detected by the radar sensor without the target object also needing to be tracked into this region. The close-range detections can be used to maintain the warning signal, but do not lead to triggering of the warning signal on their own, since close-range detections allow only the presence of the target object in the close range to be inferred, rather than the exact position of the target object. The effect achieved by the method according to the invention is that the driver can be reliably warned about the presence of a target object in the warning region. The alarm does not fail to materialize or waver, which means that the driver is also not distracted from the current road situation.

In one embodiment, the warning signal is maintained independently of the tracking of the target object in the warning region or even without the use of this tracking. It is thus possible for just the raw detection in the close range to decide whether or not output of the warning signal is maintained. There is therefore no need for tracking of the target object or of the reflection points within the warning region.

Preferably, the warning region is a blind spot of the motor vehicle. Preferably, the warning region is defined beside the motor vehicle, particularly directly adjacent to a lateral flank of the motor vehicle. The width of the warning region in the vehicle transverse direction may be 2 m, for example; the length of the warning region in the vehicle longitudinal direction may be 7 m, for example. As seen in the vehicle longitudinal direction, the warning region begins preferably 2 m in front of the rear end of the motor vehicle and ends preferably 5 m behind the vehicle. Therefore, the driver is warned about target objects that could actually present a hazard. Unnecessary alarm signals are avoided.

The detection of the target object or the reflection points in the sensing region of the radar sensor is preferably effected by comparing the level of the received signals with a detection threshold. If the amplitude of the received signal exceeds the detection threshold, a detection is obtained. The detection threshold can also be dynamically customized on the basis of the aforementioned CFAR method during operation of the radar sensor.

The prescribed close range in which raw detections are sought can stretch as far as an upper distance limit value from the radar sensor, which is in a value range from 2 m to 6 m, particularly from 3 m to 5 m. The upper distance limit value of the close range may be 4 m, for example. If a reflection point is detected by the radar sensor up to this distance limit value, the output of the warning signal is maintained. If need be, it is also possible for a lower distance limit value to be defined, from which detection leads to the warning signal being maintained. This lower distance limit value may be in a value range from 0.5 m to 1 m, for example. The effect achieved by the cited selection of the distance limit values for the prescribed close range is that of maintaining the output of the warning signal so long as there is actually a target object in the relevant surrounding region of the motor vehicle. The driver is therefore provided with particularly effective assistance in driving the motor vehicle by the driver assistance system.

The sensing angle or beam angle, particularly the azimuthal beam angle, of the radar sensor may be divided into a plurality of angle subregions, so that within a measurement cycle of the radar sensor a plurality of subregions of the whole sensing region are sensed by the radar sensor one after the other, namely particularly in the azimuthal direction. By way of example, this means that the main lobe of the transmission antenna and/or of the reception antenna of the radar sensor is electronically swivelled, particularly in the azimuthal direction, in order to be able to sense a wide sensing region overall with a relatively narrow main lobe. The output of the warning signal is preferably maintained so long as the radar sensor detects a reflection point in at least one subregion within the prescribed close range, particularly in at least two—preferably directly adjacent—subregions within the prescribed close range. In order to maintain the warning signal, it is possible in this case to monitor either all subregions of the whole sensing region or else just a subset of the subregions for reflections. Hence, the angle width of the prescribed close range can be adjusted specifically with a view to maintaining the warning signal, namely by means of an appropriate selection of the subregions that are to be searched for reflection points.

The maintenance of the warning signal can also be plausibilized: the output of the warning signal can be maintained so long as the detection within the prescribed close range takes place in at least two, particularly directly adjacent, distance resolution cells of the radar sensor. Additionally or alternatively, provision may also be made for the warning signal to be maintained so long as the detection within the prescribed close range takes place in at least two, particularly directly adjacent, Doppler resolution cells. The warning signal is therefore maintained only if detection in the close range can be attributed to target objects that are actually present, particularly other vehicles.

An additional criterion may be prescribed for maintenance of the warning signal: after the target object enters the warning region it is possible for the output of the warning signal to be maintained so long as the following two criteria are simultaneously met: firstly so long as the radar sensor detects a target object of some kind in the prescribed close range and secondly so long as the radar sensor tracks at least one reflection point on a target object in a tracking region that is prescribed in relation to the motor vehicle and different from the warning region. Besides the warning region, an additional tracking region is thus defined in the surroundings of the motor vehicle, and the warning signal is maintained only if besides the first criterion additionally the second criterion is also met, that this tracking region contains currently stable reflection points that are tracked by the radar sensor or whose current position relative to the radar sensor is known. The tracking region therefore needs to contain at least one validated reflection point (track) that meets particular criteria, for example has already existed for a predetermined number of measurement cycles and/or has an absolute speed greater than zero and/or has moved more than a prescribed distance and the like. Definition of the tracking region allows the driver of the motor vehicle to be warned particularly reliably about larger vehicles, such as particularly about heavy goods vehicles, that are in the blind spot. In the case of large target objects, such as an HGV, a large number of detection points are also present on the rear portion of the vehicle in the majority of cases. A plurality of detection points that can be tracked that are outside the warning region are existent in the majority of cases. The reason is that such HGVs are particularly expansive target objects that extend over a large multiplicity of resolution cells of the radar sensor. When such an HGV enters the warning region, just one region of the HGV is within the warning region, while a larger section of the HGV is outside the warning region. That region of the HGV that is outside the warning region then causes reflection points that can be tracked by the radar sensor.

In order, even in the case of expansive vehicles of this kind, to warn the driver about the danger as reliably and flawlessly as possible, one embodiment has provision for the tracking region to be defined behind the warning region in the vehicle longitudinal direction and to directly adjoin the warning region in the vehicle longitudinal direction. The length of the tracking region in the vehicle longitudinal direction may be in a value range from 5 m to 15 m, particularly from 8 m to 10 m. The length may be 9 m, for example. By contrast, the width of the tracking region in the vehicle transverse direction may be in a value range from 1 m to 3 m, particularly may be 2 m. The width of the tracking region can thus correspond to the width of the warning region.

The invention additionally relates to a driver assistance system that is designed to perform a method according to the invention. A motor vehicle according to the invention, particularly a car, comprises a driver assistance system according to the invention. The preferred embodiments presented with reference to the method according to the invention, and the advantages of said preferred embodiments, are correspondingly valid for the driver assistance system according to the invention and for the motor vehicle according to the invention.

Further features of the invention will emerge from the claims, the figures and the description of the figures. All the features and combinations of features that are cited in the description above and also the features and combinations of features that are cited in the description of the figures below and/or shown in the figures alone can be used not only in the respectively indicated combination but also in other combinations or else on their own.

Figure 2:
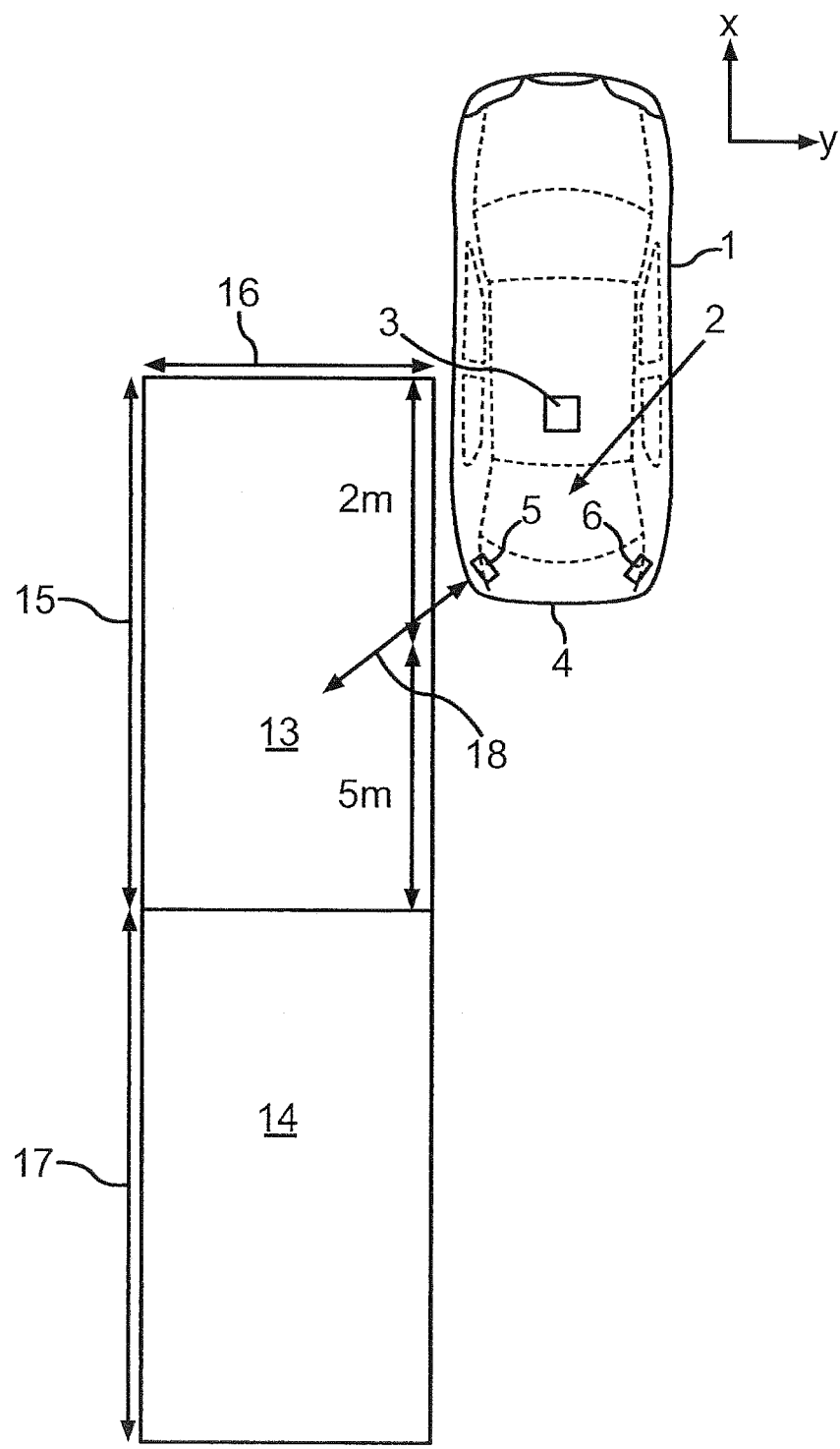

The invention will now be explained in more detail using a preferred exemplary embodiment and with reference to the appended drawings, in which:

FIG. 1 shows a schematic illustration of a motor vehicle with radar sensors according to an embodiment of the invention; and FIG. 2 shows a schematic illustration of the motor vehicle, with a method according to an embodiment of the invention being explained in more detail.

A motor vehicle 1 that is shown in FIG. 1 is a car, for example. The motor vehicle 1 comprises a driver assistance system 2 that assists the driver in driving the motor vehicle 1. The driver assistance system 2 is a blind-spot monitoring system that is designed to warn the driver about the presence of target objects in the blind spot. The driver assistance system 2 includes two radar sensors 5, 6, that are arranged in concealed fashion behind a rear bumper 4 of the motor vehicle 1. The first radar sensor 5 is arranged in a rear left-hand corner region, while the second radar sensor 6 is arranged in a rear right-hand corner region of the motor vehicle 1. Both radar sensors 5, 6 are behind the bumper 4 and are therefore not visible from outside the vehicle 1. The driver assistance system 2 additionally comprises an output device 3 that is electrically coupled to the radar sensors 5, 6 and that is designed to output a warning signal to the driver. The warning signal may be an audible alarm and/or a visual display, for example. The warning signal is used to warn the driver about the presence of target objects in the blind spot.

In the exemplary embodiment, the radar sensors 5, 6 are frequency-modulated continuous wave radar sensors (FMCW). The radar sensors 5, 6 each have an azimuthal sensing region $\phi$ that, in FIG. 1, is bounded by two lines 7a, 7b (for the left-hand radar sensor 5) and 8a, 8b (for the right-hand radar sensor 6). The azimuthal sensing angle $\phi$ is 150°, for example. This angle $\phi$ defines a respective field of view or sensing region 9 or 10 of the respective radar sensor 5, 6 in the azimuthal direction and hence in the horizontal direction. The fields of view 9, 10 can also overlap, as a result of which there is an overlap region 11.

Each radar sensor 5, 6 contains an integrated computation device, for example in the form of a digital signal processor, that actuates the radar sensor 5, 6 and furthermore processes and evaluates the received signals. Alternatively, it is also possible for an external computation device that is common to the two sensors 5, 6 to be provided, however, which can then process the received signals from the two sensors 5, 6.

In the respective fields of view 9, 10, the radar sensors 5, 6 can detect vehicle-external target objects 12a (on the left) and 12b (on the right). In particular, the radar sensors 5, 6 can determine the distance of the target objects 12a and 12b from the respective radar sensor 5, 6, and also the respective target angle and relative speed of the target objects 12a and 12b in relation to the motor vehicle 1—these are measured variables from the radar sensors 5, 6.

With additional reference to FIG. 1, the radar sensor 5—and similarly also the sensor 6—can successively irradiate various subregions A, B, C, D, E, F, G of the azimuthal field of view 9. These subregions A to G are angle ranges, and for the purpose of sensing the subregions A to G in succession a transmission lobe of the transmission antenna of the radar sensor 5, for example, is electronically swivelled in the azimuthal direction, namely on the basis of the phase array principle. The different orientations of the transmission lobe are indicated schematically in FIG. 1 for the different regions A to G. In the azimuthal direction, the reception antennas of the radar sensor 5 can have a wide reception characteristic overall that covers the whole azimuthal field of view 9. Other refinements can alternatively provide narrow reception angle ranges in conjunction with wide transmission lobes.

For the sake of clarity, FIG. 1 shows just the subregions A to G of the field of view 9 of the first radar sensor 5. Accordingly, the horizontal field of view 10 of the second radar sensor 6 is also divided into a plurality of subregions in this case, however. Although the rest of the description relates to the operation of the first sensor 5, the operation of the second sensor 6 corresponds to that of the first sensor 5.

The number of subregions A to G is shown merely by way of example in FIG. 1 and can differ depending on the embodiment. The exemplary embodiment provides a total of seven subregions A to G that are illuminated by the radar sensor 5 one after the other. Alternatively, four such "beams" may be provided or it is also possible for just a single "beam" to be provided.

The operation of the radar sensor 5 is as follows: in a single measurement cycle of the radar sensor 5, the main lobe of the transmission antenna is gradually swivelled once from subregion A to subregion G, so that the subregions A to G are illuminated one after the other. For each subregion A to G, a respective time sequence of frequency-modulated chirp signals (chirps) is transmitted. First of all, such a sequence of chirp signals is transmitted for subregion A. After a prescribed break in transmission, a sequence of chirp signals is transmitted into subregion B. After a further prescribed break in transmission, subregion C is irradiated, etc.

FIG. 2 now shows the motor vehicle 1 in plan view, with a warning region 13 and a tracking region 14 being prescribed in the surroundings of the motor vehicle 1. The warning region 13 corresponds to the blind spot of the motor vehicle 1. For the sake of clarity, the warning region 13 is depicted only on the left-hand side of the motor vehicle 1; a corresponding region is also defined on the right-hand side, however, and is sensed using the radar sensor 6.

The warning region 13 has a length 15 of 7 m, for example, in the vehicle longitudinal direction x. The warning region 13 is a rectangular region that stretches firstly 2 m forwards, for example, and secondly 5 m rearwards, as seen from the rear edge or from the bumper 4 of the motor vehicle 1. The width 16 of the warning region 13 in the vehicle transverse direction y is 2 m, for example.

The tracking region 14 is also a rectangular region that directly adjoins the warning region 13 at the rear thereof in the vehicle longitudinal direction x. The length 17 of the tracking region 14 may be 9 m, for example, which means that the tracking region 14 ends at a distance 14 m behind the motor vehicle 1. The width of the tracking region 14 is likewise 2 m.

A method according to an embodiment of the invention is described in more detail below: the radar sensor 5 is used to detect a target object 12a (FIG. 1) that is in the tracking region 14, for example. This target object is an HGV, for example. In this case, the transmitted radar waves are reflected at a multiplicity of reflection points on the HGVs. The reflection points are associated with the same target object, namely the HGV. The radar sensor 5 tracks the target object over a multiplicity of measurement cycles. The target object then enters the warning region 13. The output device 3 begins to output the warning signal (e.g. continuously or continually). The target object in the warning region 13 then no longer needs to be tracked further. After the target object enters the warning region 13, the radar sensor 5 checks whether or not there is at least one reflection point in a prescribed close range 18, which is indicated merely schematically in FIG. 2. Thus, a check is performed to determine whether or not reflection and hence detection in terms of the threshold value being exceeded actually takes place in the close range 18. If this criterion and additionally the condition that at least one reflection point is currently being tracked by the radar sensor 5 in the tracking region 14 are met, output of the warning signal is maintained. Only if no detection takes place in the close range 18 or no reflection point (track) is tracked in the tracking region 14 is the output of the warning signal interrupted.

Detection in the close range 18 means particularly that, within a prescribed distance from the sensor 5, a reflection point of some kind is actually detected whose target echo exceeds a detection threshold. In respect of the angular extent of the close range 18, it is either possible for all the subregions A to G to be examined for reflection points or just a subset of subregions A to G can be considered. By way of example, just the central subregions B to F can be examined.

By way of example, the close range 18 ends at an upper distance limit value from the radar sensor 5 of 2.4 m to 4 m, for example. This can correspond to the front two or three or four or five distance resolution cells of the radar sensor 5.

The warning signal is thus activated immediately when a validated reflection point enters the warning region 13, i.e. a reflection point that has already been tracked earlier and in so being meets predetermined criteria, such as that it has already been tracked for a predetermined period and/or that it has an absolute speed of greater than zero and/or that it has moved more than a prescribed distance. When such a reflection point enters the warning region 13, the warning signal is output so long as firstly a reflection point of some kind is detected in the close range and secondly at least one reflection point is currently being tracked in the tracking region 14, i.e. its current position is all that is known in the radar sensor 5.

The former criterion can also be substantiated to the effect that detection takes place simultaneously, that is to say within the same measurement cycle, in each of at least two adjacent subregions A to G, in each case within the prescribed close range 18. This criterion can also be refined further, namely such that simultaneous detection in at least two distance resolution cells and/or Doppler resolution cells of the radar sensor 5 is required.

The invention claimed is:

1. A method for the output of a warning signal for warning the driver of a motor vehicle about the presence of a vehicle-external target object in a warning region, which is prescribed in relation to the motor vehicle, by means of a driver assistance system of the motor vehicle, in which:
    a radar sensor is used to transmit electromagnetic radar signals into a sensing region of the radar sensor in each of successive measurement cycles of the radar sensor and to receive radar signals reflected by the target object as received signals;
    the received signals are used for detection of the target object by means of the radar sensor and the tracking said target object in the sensing region over the measurement cycles;
    if the target object enters the prescribed warning region, the warning signal is output by means of an output device,
    wherein after the target object enters the warning region the output of the warning signal is maintained for as long as the radar sensor detects the target object or another target object in its sensing region within a prescribed close range, and
    wherein after the target object enters the warning region the output of the warning signal is maintained so long as the following two criteria are simultaneously met:
        so long as the radar sensor detects the target object or another target object in the sensing region within the prescribed close range, and
        so long as the radar sensor within the same measurement cycle that said target object in the warning region or said another target object is detected, tracks at least one target object in a tracking region that is prescribed in relation to the motor vehicle and different from the warning region.

2. The method according to claim 1, wherein independently of the tracking of the target object in the warning region or without the use of the tracking of the target object in the warning region the output of the warning signal is maintained so long as the radar sensor detects the target object or another target object within the prescribed close range.

3. The method according to claim 1, wherein the warning region is a blind spot of the motor vehicle.

4. The method according to claim 1, wherein the detection of the target object in the sensing region is effected by comparing the level of the received signals with a detection threshold.

5. The method according to claim 1, wherein the prescribed close range stretches as far as an upper distance limit value from the radar sensor, which is in a value range from 3 m to 5 m.

6. The method according to claim 1, wherein within a measurement cycle of the radar sensor a multiplicity of subregions of the whole sensing region are sensed by the radar sensor one after the other and the output of the warning signal is maintained so long as the radar sensor detects the target object or another target object within the prescribed close range in at least one subregion in at least two subregions simultaneously.

7. The method according to claim 1, wherein the output of the warning signal is maintained so long as the detection within the prescribed close range is effected in at least one of at least two distance resolution cells of the radar sensor and at least two Doppler resolution cells of the radar sensor.

8. The method according to claim 1, wherein the tracking region is defined behind the warning region in the vehicle longitudinal direction and directly adjoins the warning region in the vehicle longitudinal direction.

9. The method according to claim 1, wherein the length of the tracking region in the vehicle longitudinal direction is in a value range from 8 m to 10 m.

10. The method according to claim 1, wherein the width of the tracking region in the vehicle transverse direction is in a value range from 1 m to 3 m or corresponds to the width of the warning region.

11. A driver assistance system for a motor vehicle, wherein the driver assistance system is designed to output a warning signal when a target object is present in a warning region prescribed in relation to the motor vehicle, and comprises:

a radar sensor for transmitting electromagnetic radar signals into a sensing region of the radar sensor in each of successive measurement cycles, to receive radar signals reflected by the target object as received signals and to use the received signals to detect the target object and to track said target object in the sensing region over the measurement cycles; and an output device that is designed to output the warning signal if the target object enters the prescribed warning region, wherein the output device is designed so that after the target object enters the warning region it maintains the output of the warning signal so long as the radar sensor detects the target object or another target object in its sensing region within a prescribed close range, and wherein after the target object enters the warning region the output of the warning signal is maintained so long as the following two criteria are simultaneously met:

so long as the radar sensor detects the target object or another target object in the sensing region within the prescribed close range, and so long as the radar sensor within the same measurement cycle that said target object in the warning region or said another target object is detected, tracks at least one target object in a tracking region that is prescribed in relation to the motor vehicle and different from the warning region.

12. A motor vehicle having a driver assistance system according to claim 11.

* * * * *